United States Patent [19]

Pomogailo et al.

[11] 3,882,046
[45] May 6, 1975

[54] CATALYST FOR POLYMERIZATION AND COPOLYMERIZATION OF OLEFINES AND A METHOD FOR PREPARING SAME

[76] Inventors: Anatoly Dmitrievich Pomogailo, ulitsa Pervaya, 33, kv. 15, Moskovskaya Oblast; Urakbai Alimbaevich Mambetov, ulitsa Abaya, 16, kv. 10, Guriev; Dmitry Vladimirovich Sokolsky, prospekt Abaya, 31, kv. 38, Alma-Ata; Alexandr Avraamovich Bolshov, ulitsa Ukrainskaya, 68 kv. 2, Guriev; Moisei Kharitonovich Gluzman, ulitsa Danilevskogo, 20, kv. 40, Kharkov; Gerta Gennadievna Kochurovskaya, ulitsa Bezdonnaya, 2, kv. 2, Kharkov; Evgeny Moiseevich Gluzman, ulitsa Danilevskogo, 20, kv. 40, Kharkov; Petr Evgenievich Matkovsky, ulitsa Pervaya, 16, kv. 26, Moskovskaya Oblast; Galina Albertovna Beikhold, Noginsky raion, p/o Chernogolovka, Obschezhiie, Moskovskaya Oblast; Irina Ivanovna Afanasieva, ulitsa Abaya, 7, kv. 10, Guriev; Mikhail Ivanovich Burymchenko, ulitsa 80/1, kv. 35, Odessa; Esengeldy Baishiganov, ulitsa Abaya, 9, kv. 14, Guriev, all of U.S.S.R.

[22] Filed: Jan. 3, 1973

[21] Appl. No.: 320,710

[52] U.S. Cl. ........ 252/429 C; 252/429 B; 260/88.2; 260/93.7; 260/94.9; 260/345.8; 260/429 R; 260/429.3; 260/429.5
[51] Int. Cl. ............................................. B01j 11/84
[58] Field of Search ................... 252/429 C, 429 B

[56] References Cited
UNITED STATES PATENTS

| | | | |
|---|---|---|---|
| 3,060,132 | 10/1962 | Weeks et al. | 252/429 B |
| 3,116,274 | 12/1963 | Boehm et al. | 252/429 B X |
| 3,168,588 | 2/1965 | White et al. | 252/429 B X |

*Primary Examiner*—Patrick P. Garvin

[57] ABSTRACT

A catalyst for polymerization and copolymerization of olefins is a binary system consisting of a complex compound formed by a halide of a transition metal belonging to Groups IVA–VA of the periodic system with polyglycolic ethers of mono- or polyfunctional alcohols, or polyglycolic esters of carboxylic acids or their anhydrosorbitols, in combination with aluminum-organic compounds.

The said complex compounds are prepared by the interaction between said ethers (esters) and halides of transition metals in organic solvents in an inert medium.

13 Claims, No Drawings

CATALYST FOR POLYMERIZATION AND COPOLYMERIZATION OF OLEFINES AND A METHOD FOR PREPARING SAME

This invention relates to catalytic polymerization processes and more particularly to catalysts for polymerization and copolymerization of olefins. The said catalysts are used in the manufacture of polyethylene, polypropylene, copolymers of ethylene with propylene and other olefins.

Known in the prior art are catalysts for polymerization and copolymerization of olefins, which are binary systems consisting of metal compounds $MX_n$ where M is a metal from IVA–VIA or VII Groups of the periodic system, X is a halogen, oxyhalogen, hydrogen, alkoxy-, aryloxy-, or amido group, n is the number characterizing the valency of M, and an aluminum-organic compound having the general formula $AlR_pY_{3-p}$, where R is a hydrocarbon radical, Y is a halogen or hydrogen, p is equal to or less than 3 (See N. Gaylord and H. Mark, Linear and Stereoregular Addition Polymers Interscience Publishers, Inc. New York, 1959).

Practically, the most often used catalysts are those based on halides of high-valency transition metals ($TiCl_4$, $VCl_4$, $VOCl_3$, $ZrCl_4$, and others) in combination with aluminum-organic compounds of the type $Al(C_2H_5)_3$; $(C_2H_5)_2AlCl$, $(C_2H_5)_2AlCl$, $Al(iso-C_4H_9)_3$ $(i-C_4H_9)_2AlCl$, $(i-C_4H_9)_2AlH$.

In order to increase the effectiveness of the binary catalysts in polymerization and copolymerization and also in order to give the polymers the desired properties (molecular weight, crystallinity, stereoregularity, and - in copolymerization- the composition of the copolymers) additives (the third component) modifying the catalyst are used. These additives are mostly nucleophilic compounds such as tertiary amines, ethers, phosphines, sulfides, etc., known commonly as Lewis bases.

In view of the fact that the character of the polymerization process largely depends on the nature of the catalyst components the introduction of the third component facilitates the control of the kinetics of the polymerization process and the properties of the produced polymers.

The disadvantage inherent in the known methods of modifying the binary catalysts used for polymerization and copolymerization of olefins is a comparatively strong tendency of the aluminum-organic compounds (and also organic compounds with other metals, e.g., lithium, boron, etc.) toward the formation of complexes of the donor-acceptor type with the third component on account of an unshared electron pair of the donor atom in the Lewis base and unfilled p orbitals of the aluminum atom. If comparatively strong Lewis bases (ammonia, aliphatic amines, etc.) are used as the third component; the aluminum-organic compounds form with them stable complex compounds, which is disadvantageous from the aspect of the catalytic activity of the system. K. Vesely (J. Polymer Sci., 34, 46 (1959), 55, 25, 1961) reports in his papers on the decreasing activity of the system $TiCl_3$-$Al(C_2H_5)_3$ used in the polymerization of propylene associated with the introduction of strong Lewis bases as modifying compounds (due to the deficiency of free aluminum-alkyl resulting from the formation of aluminum-alkyl complexes inactive with respect to polymerization). At the same time, complexes of aluminum,-alkyls with weak Lewis bases, for example with ethers (G. Geiselr, W. Knothe, GDR Pat. No. 26,251 ) possess comparatively high activity in the polymerization of ethylene.

Moreover, when introduced directly into the reaction mixture, the third component can react with the already formed catalytic complex and destroy it.

Nevertheless, the introduction of some additives, for example, 0.1–10.0 per cent by weight of the product of alkylphenol condensation with 5–10 mols of ethylene oxide (Weeks, L. E. M. Manimie, R.J., U.S. Pat. No. 3,060,132 and 3,159,615) into the suspension formed by $TiCl_4$ and $Al(iso-C_4H_9)_3$, sometimes increases its activity. But in the general case, these methods of modification are not sufficiently effective, since they involve undue consumption of the third component and aluminum-organic compounds.

To minimize this disadvantage, complex compounds of the donor-acceptor type, halides of transition metals with the third component, are sometimes used as components of the catalytic systems. For example, it has been proposed to use, as the catalysts in the polymerization of $\alpha$-olefins, complex compounds of $TiCl_4$, $VCl_4$, $VOCl$ with ethers or esters (Japanese Pat. Nos. 552, 19,915, 2,910) in mixtures with aluminum-organic compounds.

The activity of such catalysts is comparable with that of the best catalysts (Ziegler-Natt). At the present time, a comparatively large number of such systems is known (cf., e.g., "Chemistry Petroleum and Petrochemical Synthesis" A. D. Pomogailo Alma-Ata, 1970, pp. 76–119 /in Russian/). However, an incessant search in this field shows that the existing methods still suffer from disadvantages.

Finally, it should be noted that one of the main problems of industrial production of polymers by the known catalytic methods is washing of the produced polymers to separate them from catalyst residues which otherwise impair stability of the polymers.

Various additives are used to facilitate the removal of the catalyst residue. These additives combine with the products deactivating the catalyst into compounds which can be easily removed. Thus, for example, after the polymerization process is over, an emulsion prepared on the basis of non-ionogenic surfactants is introduced into the polymer (U.S. Pat. No. 3,320,223).

In this respect, the search for additives which would combine therein the functions of the third component modifying the catalyst on one hand, and of an additive facilitating the removal of the catalyst residue after polymerization on the other hand, is of special interest.

The object of this invention is to provide a catalyst for polymerization and copolymerization of olefins which would increase the efficiency of the polymerization process to ensure high yields of the polymer possessing improved physico-mechanical properties.

Another object of the invention is to discover modifying ligands which would combine with the compounds of transition to form complex compounds highly active with respect to polymerization and copolymerization.

These and other objejcts of the invention have been attained in a catalyst for polymerization and copolymerization of olefins which, according to the invention is a binary system consisting of a complex compound having the general formula $/D—O—MX_{n-1}/\ mMX_n$ formed in the reaction between $MX_n$ and D, where M is a transition metal of groups IVA or VA of the periodic system, X is a halogen, oxyhalogen, n is the number indicating the valency of M, m is a whole number from 1 to 50, and D is a modifying ligand of the electron-donor type selected from the group consisting of a. polyglycolic ethers of monofunctional alcohols $R-(OCH_2CH_2)_k-OH$, where R is $C_6H_{13}-C_9H_{19}$ and k is from 3 to 9;

b. polyglycolic ethers of polyfunctional alcohols $(R-COOCH_2)_2 C [CH_2(OCH_2CH_2)_k-OH]_2$, where R is $C_4H_9 - C_6H_{13}$ and k is from 2.5 to 29;

c. polyglycolic esters of carboxylic acids $R-CO-(OCH_2CH_2)_k OH$ where R is $C_{11}H_{23}-C_{17}H_{35}$ and k is from 10 to 160;

d. anhydrosorbitols of carboxylic acids (twins)

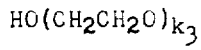

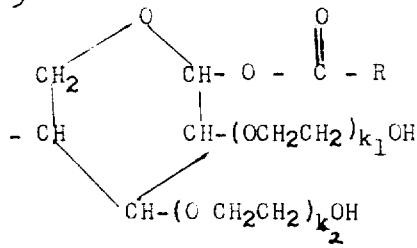

where R is $C_{11}H_{23} - C_{17}H_{35}$ and $k_1 + k_2 + k_3$ is from 20 to 85 in combination with $AlR_pY_{3-p}$ where R is a lower alkyl or isoalkyl or Y is chloride, hydrogen, and p is from 1 to 3.

The following are examples of catalysts for polymerization and copolymerization of olefins according to the invention:

1. $[C_{17}H_{33}CO(OCH_2CH_2)_{40} - O - TiCl_3] \cdot 14TiCl_4-(i-C_4H_9)_2AlCl$;

2. $[C_9H_{19}(OCH_2CH_2) - O - TiCl_3] \cdot 3TiCl_4 - (C_2H_5)_2 AlCl$;

3. $[C_{11}H_{23}CO(OCH_2CH_2) - O-VCl_3] \cdot 14VCl_4 - (C_2H_5)_2 AlCl$;

4. $[C_6H_{13}(OCH_2CH_2)_4 -O-TiCl_3] \cdot TiCl_4 - (i - C_4H_9)_2AlCl$;

5. $[C_9H_{19}(OCH_2CH_2)_9 -O-VCl_3] \cdot 3VCl_4-(C_2H_5)_2AlCl$;

6. $(C_4H_9COOCH_2)_2C [CH_2(OCH_2CH_2)_{7.5} -O-VCl_3]_2 \cdot 5VCl_4- (i - C_4H_9)_2AlCl$;

7. $(C_4H_9COOCH_2)_2C [CH_2(OCH_2CH_2)_{18.5} -O- TiCl_3]_2 \cdot 14TiCl_4 - (C_2H_5)_2AlCl$;

8. $(C_4H_9COOCH_2)_2 C [CH_2(OCH_2CH_2)_{12.5} -O - VOCl_2]_2 \cdot 8VOCl_3 - (C_2H_5)_3Al_2Cl_3$;

9. $[C_5H_6O(C_{17}H_{33}COO)_3 (OCH_2CH_2)_{85} - O- VOCl_2] \cdot 30VOCl_3 - (C_2H_5)_2AlCl$;

10. $[C_5H_6O(C_{11}H_{23}COO)(OCH_2CH_2)_{20} (-O-VCl_2)_3] \cdot 7VCl_4- (i - C_4H_9)_2 AlH$;

11. $(C_4H_9COO)_2C [CH_2(OCH_2CH_2)_{29} - O -VOCl_2]_2 \cdot 18VOCl_3 - (C_2H_5)_3 Al_2Cl_3$;

12. $[(C_5H_6O)(C_{15}H_{31}COO)(OCH_2CH_2)_{40} - (OVCl_3)_3] \cdot 14VCl_4 - (i - C_4H_9)_2AlH$.

The catalysts for polymerization and copolymerization of olefins according to the invention have the following advantages.

1. The use of polyglycolic ethers of monofunctional alcohols (a), of polyfunctional alcohols (b), and also polyglycolic esters of carboxylic acids (c) or their anhydrosorbitols (d) as ligands results in the formation of heterogeneous complex compounds whose interaction with aluminum-alkyls in the polymerization process can be easily controlled, which promotes a longer life for the catalysts $(D - O-MX_{n-1}) \cdot mMX_n-AlR_pY_{3-p}$ as compared with the life known catalysts, and hence increases the yield of the polymer about 1.5-2 times.

2. Modifying ligands D used in the present invention are comparatively weak Lewis bases, and they therefore do not interfere with alkylation of the transition metal with the aluminum-organic compound, and they promote the formation of a comparatively large number of active entities of polymerization and accelerate the reaction rate.

3. Catalysts for the polymerization and copolymerization of olefins of the known type possess an increased activity in a medium of aromatic solvents. But even in the early stages of the polymerization procoess, alkylation of the aromatic solvents, polymerizable by the olefin, takes place alongside with the polymerization. Thus, during polymerization of ethylene in benzene with a system $TiCl_4-(C_2H_5)_2AlCl$, the ratio of the products of polymerization and alkylation is 0.8:1.1.

The modifying ligands used in this invention react with the products of the evolutionary phenomena taking place in the catalyst which deactivate and convert it into the alkylating catalyst, and thus inhibit the cationic direction of the process to make it selective.

4. Catalysts for polymerization and copolymerization of olefins according to the present invention catalyze the formation of polymers having higher molecular weights, since the ligands of the (a), (b), (c) and (d) type coordinate with the agents responsible for the discontinuation or limitation of the polymer chains to prolong the life of the latter.

5. Modifying ligands used in the present invention ensure more complete removal of the catalyst residues from the polymers after the polymerization has been completed. The ash content of the polymers after alcohol washing decreases two times as compared with the ash content of the polymers prepared with the usual Ziegler-Natt catalysts.

6. The catalyst prepared according to the present invention is stable in storage and more stable in the polymerization process, while the known components of catalysts for polymerization and copolymerization of olefins, halides of high-valency transition metals ($VCl_4$ in particular) are unstable in storage, especially when exposed to light, and they decompose spontaneously into halides of lower valency which markedly decreases the activity of the catalyst.

The above-named advantages are responsible for the improved physico-mechanical indices of the polymers prepared with the claimed catalysts for polymerization and copolymerization of olefins: density, melting point, yield point, tensile strength, specific elongation at break.

It is impossible to attain the combination of all the above named advantages in a polymer prepared with the known catalysts (including that covered by U.S. Pat. Nos. 3,060,132 and 3,159,615).

The proposed catalysts are prepared by a method in which, according to the invention the said complex compounds of transition metals are obtained by the reaction between solutions of a metal compound $MX_n$, where M is a transition metal from Groups IVA-VA of the periodic system, X is a halogen or oxyhalogen, and n is the number denoting the valency of M, and a solution of a substance selected from the following groups:

a. polyglycolic ethers of monofunctional alcohols $R-(OCH_2CH_2)$, where R is $C_6H_{13}-C_9H_{19}$ and k is from 3 to 9;

b. polyglycolic ethers of polyfunctional alcohols (R—COOCH$_2$)$_2$C [CH$_2$(OCH$_2$CH$_2$)$_k$—OH]$_2$, where R is C$_4$H$_9$—C$_9$H$_{13}$, and k = 2.5–29;

(c). polyglycolic esters of carboxylic acids R—CO(OCH$_2$CH$_2$)$_k$OH, where R is C$_{11}$H$_{23}$—C$_{17}$H$_{35}$ and $k$ is from 10 to 160;

d. anhydrosorbitols of carboxylic acids (twins)

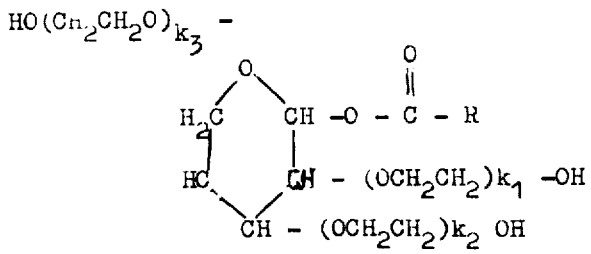

where R is C$_{11}$H$_{23}$—C$_{17}$H$_{35}$; $k_1 + k_2 + k_3 =$ from 20 to 85, in aromatic or chlorine containing solvents in an inert atmosphere with subsequent isolation and drying of the principitated complex compound.

The optimum concentrations of MX$_n$ and D in aromatic and chlorine-containing solvents are from 1 to 5 per cent, and the preferable solvent is carbon tetrachloride. The said components are mixed by intense stirring. In 1–5 hours following mixing of the reactants, the precipitate is separated on a filter in a current of dry nitrogen or argon, washed with the solvent to the absence of chemically non-bonded components and dried in a vacuum filter. Then the product is packed in an inert atmosphere in spherical glass ampoules and sealed.

The results of the elementary analysis and infra-red spectroscopy of the prepared products indicate that the interaction of the modifiers of this type, which are potentially polydentate ligands in the complexing reactions with the halides of the transition metal, might be a multi-stage process, the first step of the transformations occurring in such complicated systems being the formation of metalloethers on account of the terminal hydroxyl groups of the ligands, for example

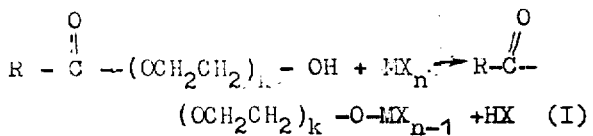

At the next stage, the reaction entities, including the carbonyl group (for oxyethylated derivatives of acids) are realized:

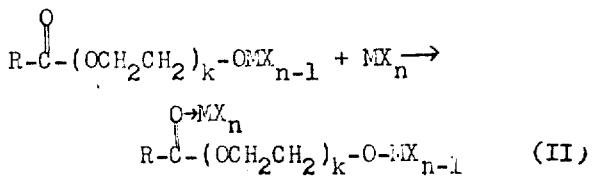

Only when considerable excess of the halide of a transition metal is present, the latter is joined to the oxyethylene links:

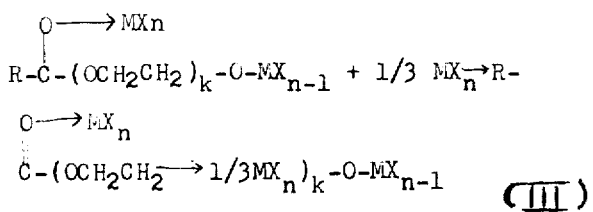

each MX$_n$ molecule being joined to the chain consisting of an average of three oxyethylene fragments.

According to the invention, the object can be attained by using the products of the interaction between polyglycolic ethers and halides of the transition metals formed at any of the three stages, but the best effect is attained with the products of the final stage III. The basic characteristics of complex compounds of this type are given in Tables 1 through 4 appended to the description.

It should be noted that the complex compounds discussed in this description have not been known in the prior art.

The modifying ligands, polyglycolic ethers of monofunctional alcohols (a), polyfunctional alcohols (b) and also polyglycolic esters of carboxylic acids (c) or of their anhydrosorbitols (d) are inexpensive and readily available substances produced by a simple process consisting in direct condensation of the corresponding compounds with ethylene oxide or propylene oxide:

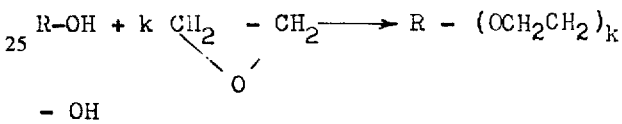

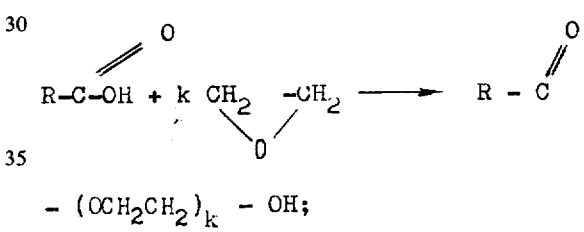

where $k$ is the number of oxyethylene (or oxypropylene) groups (varied from 2.5 to 160). Some characteristics of the starting ligands, viz., polyglycolic esters of carboxylic acids are given in Table 5, and of oxyethylated esters of anhydrosorbitols of carboxylic acid (twins), in Table 6 copended to the description.

The latter were prepared by oxyethylation of anhydrosorbitols of carboxylic acids:

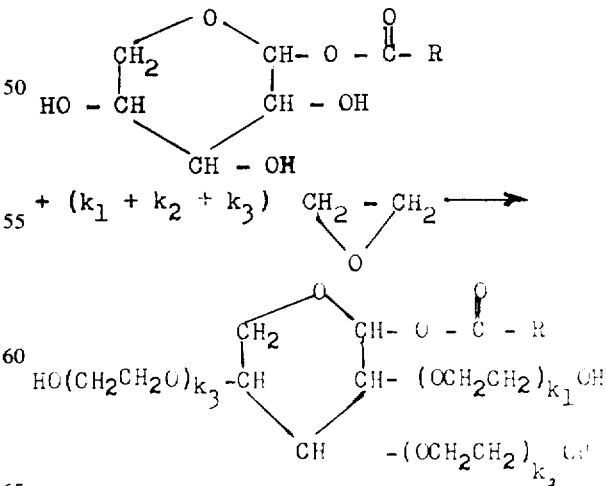

The catalyst for polymerization and copolymerization, according to this invention can be prepared by both continuous and batch processes.

For a better understanding of the present invention, it will be illustrated by an example of practical embodiment of the method for preparing a complex compound, the component of the binary catalyst.

EXAMPLE 1

Into a three-necked flask were charged in an inert atmosphere 7.6 g of $TiCl_4$ (0.04 mol) in 150 ml of carbon tetrachloride. The flask was provided with a stirrer with a hydraulic mercury seal and a separating funnel, and also a tap for delivery of argon. 5.4 g (0.01 mol) of oxyethylated nonyl alcohol $C_9H_{19}$—$COCH_2CH_2)_9$ —OH in 120 ml of carbon tetrachloride were added from the separating funnel with intense stirring at room temperature during a period of 60 minutes. The evolved HCl was removed by flushing with argon with intense stirring for another hour.

The formed precipitate was transferred in an inert medium onto a vacuum filter; after filtration the precipitate was washed two times with fresh portions of carbon tetrachloride and dried finally in vacuum at a residual pressure of 1 mm Hg and a temperature of 20°C. The finished product was packed in a current of argon into spherical glass ampoules and sealed. The yield of the product was 11 g (85 per cent of theory).

The other complex compounds, whose characteristics are given in Table 1 through 4, were prepared by a similar procedure. Tables 5 and 6 list some characteristics of polyglycolic esters of fatty acids and oxyethylated esters of fatty acids, respectively.

The synthesized complex compounds were used in combination with aluminum-organic compounds as catalysts for polymerization and copolymerization of olefins. The catalysts for polymerization and copolymerization were tested to show the following results as shown in Examples 2-13.

EXAMPLE 2

Into an evacuated 0.25-liter reaction vessel provided with a stirrer and a loading device, were charged at 40°C 100 ml of n-heptane, 0.0936 g of $[C_{17}H_{33}CO(OCH_2CH_2)_{40}$ — O— $TiCl_3]$. $14TiCl_4$ and 0.3112 g of $(i-C_4H_9)_2AlCl$; the pressure of ethylene was raised to 218 mm Hg, which corresponds to a concentration in the reaction zone of 0.026 mol/liter.

The polymerization was continued for 1 hour, the process was then discontinued by adding 25 ml of 5 per cent HCl in ethyl alcohol and the mixture was stirred for 30 minutes.

The polymer was washed from the of the catalyst residue successively with ethyl alcohol and distilled water, and dried in a vacuum drier at 40°C. The yield of polyethylene was 5.2 g; the characteristic viscosity in tetraamine at 130°C was 1.8; ash content, 0.011 per cent. The yield of polyethylene prepared in the same conditions by the process utilizing the known catalyst $TiCl_4$—$(i-C_4H_9)_2AlCl$ was 2.7 g; the characteristic viscosity, 1.3; ash content, 0.028 per cent.

EXAMPLE 3

Under the conditions described in Example 2, there were charged 0.0337 g of $[(C_9H_{19}(OCH_2CH_2)_9$ —O— $TiCl_3]$ .$3TiCl_4$, 0.2030 g of $(C_2H_5)_2AlCl$, 100 ml of benzene, and ethylene to build up a pressure of 296 mm Hg (which corresponds to its concentration in the reaction zone of 0.03 mol/liter). The yield of polyethylene was 2.9 g; ash content, 0.014 per cent. The yield of polyethylene prepared under the same conditions with the known system $TiCl_4$—$(C_2H_5)_2AlCl$ was 0.8 g. The yield of ethylbenzene (the product of benzene alkylation with ethylene) was 1.1 g.

EXAMPLE 4

Under the conditions described in Example 3, there were charged 0.0435 g of $[(C_{11}H_{23}CO(OCH_2CH_2)_{40}$—O—$VCl_3]$ .$14$ $VCl_4$ and 0.2827 g of $(C_2H_5)_2AlCl$. The yield of polyethylene was 6.3 g; the characteristic viscosity, 8.7.

EXAMPLE 5

Under the conditions described in Example 3, to 0.0746 g of $[(C_6H_{12}(OCH_2CH_2)_4$—O—$TiCl_3]$.$TiCl_4$ 0.3017 g of $(i-C_4H_9)_2$ AlCl was added. The yield of the polymer was 3.4 g.

EXAMPLE 6

Under the conditions described in Example 3, to 0.03010 g of $[(C_9H_{19}(CH_2CH_2O)_9$—O—$VCl_3]$ .$3VCl_4$ 0.0905 g of $(C_2H_5)_2AlCl$ was charged. The yield of polyethylene was 2.8 g; $[\eta] = 7.9$.

EXAMPLE 7

Into an evacuated metallic reactor of 1.0-liter capacity were charged 0.8 liter of freshly distilled benzene, 0.421 g of $(C_4H_9COOCH_2)_2C$ $[CH_2(OCH_2CH_2)_{7.5}$—O—$VCl_3]_2$ .$5VCl_4$, 0.8011 g of $(i-C_4H_9)_2AlCl$ and ethylene to build up the overall pressure of 2.5 kg/sq.cm, which was then maintained throughout the entire process of polymerization. The temperature inside the reactor was maintained at 40°C. The polymerization was continued for 30 minutes and stopped by adding 50 ml of ethyl alcohol. The polymer was washed successively with alcohol. and distilled water, and dried in a vacuum drier at 40°C. The yield of polyethylene is 128 g. The polymer has the following characteristics: viscosity, 8.1; density, 4.945 g/cc; m.p., 130°–132°C; the yield point, 230 kg/sq.cm; specific elongation at break, 220 per cent.

EXAMPLE 8

Under the conditions described in Example 3, there were charged 0.0411 g of $(C_4H_9COOCH_2)_2$ C $[CH_2(OCH_2CH_2)_{18.5}$—O—$TiCl_3]_2$. $14TiCl$ and 0.1201 g of $(C_2H_5)_2AlCl$. After washing, the yield of high-molecular linear polyethylene was 2.8 g (the content of methyl groups was 0.15 per 1000 atoms of carbon).

EXAMPLE 9

Under the conditions described in Example 3, there were introduced 0.031 g of $(C_4H_9COOCH_2)_2$ C $[(OCH_2CH_2)_{12.5}$—O—$COCl_2]$ .$8VOCl_3$ and 0.11 g $(C_2H_5)_3$ $Al_2Cl_3$. The yield of high-molecular polyethylene was 3.0 g; $[\eta] = 9.2$.

EXAMPLE 10

Under the conditions described for Example 3, there were introduced 0.1 g of $[C_5H_6O(C_{15}H_{33}COO)_3$-$(OCH_2CH_2)_{85}$ —O—$VOCl_2]$ . $30VOCl_3$ and 0.227 g of $(C_2H_5)_2AlCl$. The yield of polyethymene was 6.5 g; $[\eta] = 8.7$; $d = 0.954$ g/cc; m.p., 130°–134°C; yield point, 220 g/sq.cm; specific elongation at break, 240 per cent. Polyethylene prepared with the known system $TiCl_4$ $(C_2H_5)AlCl$ (in benzine) is characterized by the following indices, respectively: 1.4; 0.940; 124–126; 225, 310.

EXAMPLE 11

Under the conditions described for Example 3, to 0.027 g of $[(C_5H_6O(C_{11}H_{23}COO)(OCH_2CH_2)_{20} - (O-VCl_3)_3].7VCl$ were added 0.0674 g of $(i-C_4H_9)_2$AlH. The yield was 3.3 g of high-molecular linear polyethylene (containing 0.2 methyl group per 1000 carbon atoms). $[\eta] = 9.0$

EXAMPLE 12

Under the conditions described for Example 7, there were introduced 0.75 g of freshly distilled benzene, 0.7916 g of $(C_4H_9COO)_2 C[CH_2(CH_2CH_2O)_{29}-O-VOCl_2]_2.18VOCl_3$, 1.12 g of $(C_2H_5)_3 Al_2Cl_3$ and a mixture of monomers of ethylene with propylene (50:50 vol. per cent) to build up a pressure of 3 atm.

The polymerization was continued for one hour, and was stopped by adding 50 ml of ethyl alcohol. The greater part of the solvent was then distilled, and the polymer was washed free of catalyst residue by a usual method. The yield was 112 g of highly elastic copolymer of ethylene with propylene.

EXAMPLE 13

Under the conditions described for Example 7, to 0.3869 g of $[C_5H_6O(C_{15}H_{31}COO)(OCH_2CH_2)_{40} - (OVCl_3)_3].14VCl_4$ and 0.6976 g of $(i-C_4H_9)_2$AlH was added a mixture of monomers of ethylene and propylene taken in the ratio of 50:50 (v/v) to build up the pressure to 2.5 atm.

The polymerization was continued for 1 hour and then 50 ml of ethyl alcohol were added. The polymers was washed with distilled water to remove the catalyst residue and to prepare 14 g of highly elastic copolymer of ethylene and propylene.

Table 1

Characteristics of Complex Compounds of Oxyethylated Nonyl Alcohol

| Complex | Color | M.p., °C | Found | | | | Calculated | | | |
|---|---|---|---|---|---|---|---|---|---|---|
| | | | M | C | H | Cl | M | C | H | Cl |
| $[C_9H_{19}(OCH_2CH_2)_{4.5}-O-TiCl_3] . TiCl_4$ | pale yellow | 74–76 | 14.25 | 31.25 | 5.76 | — | 14.01 | 31.51 | 5.40 | 36.20 |
| $[C_9H_{19}(OCH_2CH_2)_{5.25}-O-TiCl_3] . TiCl_4$ | yellow | 82–83 | 13.02 | 33.11 | 6.04 | — | 13.37 | 32.58 | 5.57 | 34.54 |
| $[C_9H_{19}(OCH_2CH_2)_{7.2}-O-TiCl_3] . 2TiCl_4$ | yellow | 86–87 | 14.89 | 27.97 | 4.65 | 40.48 | 14.27 | 28.27 | 4.83 | 39.34 |
| $[C_9H_{19}(OCH_2CH_2)_9-O-TiCl_3] . TiCl_4$ | yellow | 117–118 | 15.48 | 25.82 | 4.65 | 42.88 | 15.19 | 25.64 | 4.34 | 42.17 |
| $[C_9H_{19}(OCH_2CH_2)_{4.5}-O-VCl_3] . VCl_4$ | brown | 65–67 | 14.33 | 31.42 | 5.89 | — | 14.76 | 31.26 | 5.35 | 35.96 |
| $[C_9H_{19}(OCH_2CH_2)_9-O-VCl_3] . 3VCl_4$ | brown | 74–76 | 16.31 | 28.89 | 4.79 | 35.45 | 15.99 | 28.17 | 4.39 | 36.34 |

Table 2

Characteristics of $MX_n$ Complexes with Polyglycolic Diethers of Pentaerythritol

| Complex | Color | M.p., °C | Found | | | | Calculated | | | |
|---|---|---|---|---|---|---|---|---|---|---|
| | | | M | C | H | Cl | M | C | H | Cl |
| $(C_4H_9COOCH_2)_2C [CH_2(CH_2CH_2O)_{7.5}-O-TiCl_3] . 5TiCl_4$ | yellow | 93–94 | — | 25.31 | 3.84 | 42.16 | 15.92 | 24.25 | 3.99 | 41.62 |
| $(C_4H_9COOCH_2)_2 C [CH_2(OCH_2CH_2)_{10}-O-TiCl_3]_2 . 7TiCl_4$ | pale yellow | 96–97 | 15.80 | 25.88 | 4.26 | — | 16.25 | 25.29 | 3.95 | 45.39 |
| $(C_4H_9COOCH_2)_2 C[(CH_2(OCH_2CH_2)_{12.5}-O-TiCl_3]_2 . 8TiCl_4$ | '' | 92–94 | 12.15 | 28.70 | 5.14 | 34.98 | 12.54 | 29.09 | 4.49 | 35.87 |
| $(C_4H_9COOCH_2)_2 C [CH_2 (OCH_2CH_2)_{18.5}-O-TiCl_3] . 14TiCl_4$ | orange red | 97–98 | 14.87 | 22.31 | 3.88 | 44.41 | 15.69 | 21.83 | 3.55 | 45.11 |
| $(C_4H_9COOCH_2)_2 C[CH_2 (OCH_2CH_2)_{29}-O-TiCl_3]-18TiCl_4$ | bright yellow | 101–102 | 14.36 | 24.17 | 4.73 | 42.53 | 14.58 | 23.72 | 3.91 | 42.21 |
| $(C_4H_9COOCH_2)_2 C [CH_2(OCH_2CH_2)_{7.5}-O-VCl_3] . 5VCl_4$ | brown | 67–68 | 14.83 | 26.04 | 5.01 | — | 13.92 | 25.48 | 4.59 | 42.19 |
| $(C_4H_9COOCH_2)_2 C[CH_2(OCH_2CH_2)_{10}-O-VCl_3]_2 . 7VCl_4$ | brown | 66–67 | 6.83 | 30.07 | 5.43 | 33.48 | 7.18 | 29.18 | 4.62 | 34.12 |
| $(C_4H_9COOCH_2)_2 C[CH_2(OCH_2CH_2)_{12.5}-O-VCl_3]_2 . 8VCl_4$ | brown | 57–58 | 4.72 | 30.37 | 5.58 | 35.46 | 5.32 | 29.18 | 4.92 | 35.62 |
| $(C_4H_9COOCH_2)_2 C[CH_2(OCH_2CH_2)_{18.5}-O-VCl_3] . 14VCl_4$ | dark brown | 67–69 | 16.46 | 30.23 | 5.53 | 30.28 | 6.67 | 29.43 | 4.96 | 29.46 |
| $(C_4H_9COOCH_2)_2 C[CH_2(OCH_2CH_2)_{29}-O-VCl_3] . 19VCl_4$ | brown | 75–76 | 13.88 | — | 4.08 | — | 14.81 | 22.69 | 3.74 | 45.78 |
| $(C_4H_9OOCH_2)_2 C[CH_2(OCH_2)_{12.5}-O-VOCl_2]_2 . 8VOCl_3$ | red-brown | | 18.01 | 27.48 | — | 36.20 | 18.25 | 27.86 | — | 30.50 |
| $(C_4H_9COOCH_2)_2 C [CH_2(OCH_2CH_2)_{29}-O-VOCl_2]_2 . 18VOCl_3$ | '' | | 16.27 | 23.84 | — | — | 16.78 | 24.24 | — | — |

Table 3 characteristics of $MX_n$ Complexes with Polyglycolic Esters of Lauric, Palmitic and Oleic Acids

| Complex | Color | M.p., °C | Found | | | | Calculated | | | |
|---|---|---|---|---|---|---|---|---|---|---|
| | | | M | C | H | Cl | M | C | H | Cl |
| $[C_{11}H_{23}CO(OCH_2CH_2)_{40}-O-TiCl_3] . 14TiCl_4$ | yellow | 120–123 | 14.64 | 25.00 | 4.78 | — | 13.79 | 24.10 | 3.98 | 39.45 |
| $[C_{15}H_{31}CO(OCH_2CH_2)_{40}-O-TiCl_3] . 14TiCl_4$ | pale yellow | 145–146 | 15.28 | 25.51 | 5.08 | — | 14.54 | 24.77 | 4.12 | 42.39 |

Table 3 – Continued characteristics of $MX_n$ Complexes with Polyglycolic Esters of Lauric, Palmitic and Oleic Acids

| Complex | Color | M.p., °C | Assay, % Found | | | | Assay, % Calculated | | | |
|---|---|---|---|---|---|---|---|---|---|---|
| | | | M | C | H | Cl | M | C | H | Cl |
| $[C_{17}H_{33}CO(OCH_2CH_2)_{10}-O-TiCl_3].14TiCl_4$ | yellow | 141–143 | 15.24 | 24.56 | 4.78 | 39.45 | 14.76 | 24.10 | 3.98 | 40.68 |
| $[C_{11}H_{23}CO(OCH_2CH_2)_{40}-O-VCl_3].14VCl_4$ | brown | 94–97 | 15.37 | 24.06 | 4.78 | 36.26 | 15.20 | 23.61 | 3.76 | 37.12 |
| $[C_{15}H_{31}CO(OCH_2CH_2)_{40}-O-VCl_3].14VCl_4$ | brown | 102–104 | 7.21 | 25.26 | 4.45 | 44.41 | 7.44 | 25.56 | 5.20 | 45.16 |
| $[C_{17}H_{33}CO(OCH_2CH_2)_{40}-O-VCl_3].14VCl_4$ | brown | 84–86 | — | 23.71 | 5.56 | 42.38 | 10.76 | 23.34 | 5.99 | 42.35 |

Table 4

Characteristics of Complex Compounds $MX_n$ with Oxyethylated Anhydrosorbitols

| Complex | Yield with respect to MX, % | Color | Assay, % Found | | | Assay, % Calculated | | |
|---|---|---|---|---|---|---|---|---|
| | | | M | C | Cl | M | C | Cl |
| $[(C_5H_6O)(C_{17}H_{33}COO)_3(OCH_2CH_2)_{85}-O-VOCl_2].30VOCl_3$ | 73 | red-brown | 17.61 | 31.04 | 38.12 | 18.20 | 31.22 | 38.64 |
| $[(C_5H_6O)(C_{11}H_{23}COO)(OCH_2CH_2)_{20}(OVCl_3)_3].7VCl_4$ | 79 | brown | 16.29 | 22.88 | 44.04 | 16.75 | 23.29 | 44.21 |
| $[(C_5H_6O)(C_{15}H_{31}COO)(OCH_2CH_2)_{40}(OVCl_3)_3].14VCl_4$ | 68 | brown | 15.79 | 22.60 | 43.01 | 16.26 | 22.74 | 43.29 |

Table 5

Some Characteristics of Polyglycolic Esters of Fatty Acids

| Name | Chemical formula | Mol. weight (calculat.) | Found, % | | Calculated % | | Consistency odor, color |
|---|---|---|---|---|---|---|---|
| | | | C | H | C | H | |
| 1 | 2 | 3 | 4 | 5 | 6 | 7 | 8 |
| Polyoxy-10-stearate | $CH_3(CH_2)_{16}CO(OCH_2CH_2)_{10}OH$ | 722 | 62.81 | 9.94 | 63.16 | 10.25 | Wax-like;pungent;specific |
| Polyoxy-20-stearate | $CH_3(CH_2)_{16}CO(OCH_2CH_2)_{20}OH$ | 1162 | 60.00 | 9.32 | 59.94 | 9.81 | Solid;faint; pale brown |
| Polyoxy-30-stearate | $CH_3(CH_2)_{16}CO(OCH_2CH_2)_{30}OH$ | 1602 | 57.93 | 9.52 | 58.43 | 9.61 | Solid;faint; pale brown |
| Polyoxy-30-valerate | $CH_3(CH_2)_3CO(OCH_2CH_2)_{30}OH$ | 1422 | 54.90 | 9.02 | 54.85 | 9.14 | Wax-like;valerian;pale biege |
| Polyoxy-30-caproate | $CH_3(CH_2)_4CO(OCH_2CH_2)_{30}OH$ | 1436 | 54.67 | 8.92 | 55.15 | 9.19 | Solid;faint; dark grey |
| Polyoxy-30-caprate | $CH_3(CH_2)_8CO(OCH_2CH_2)_{30}OH$ | 1492 | 56.09 | 9.20 | 56.30 | 9.38 | Wax-like;pungent,specific; pale grey |
| Polyoxy-30-laurate | $CH_3(CH_2)_{10}CO(OCH_2CH_2)_{30}OH$ | 1520 | 56.70 | 9.41 | 56.77 | 9.48 | Wax-like; faint;grey |
| Polyoxy-30-palmitate | $CH_3(CH_2)_{14}CO(OCH_2CH_2)_{30}OH$ | 1576 | 57.12 | 9.82 | 57.86 | 9.64 | Solid;faint; grey |
| Polyoxy-30-oleate | $CH_3(CH_2)_7(CH=CH(CH_2)_7CO-(OCH_2CH_2)_{30}OH$ | 1602 | 58.11 | 9.49 | 58.44 | 9.61 | Solid;faint; pale brown |
| Polyoxy-40-stearate | $CH_3(CH_2)_{16}CO(OCH_2CH_2)_{40}OH$ | 2044 | 56.89 | 9.14 | 57.53 | 9.59 | Solid;white |
| Polyoxy-160-stearate | $CH_3(CH_2)_{16}CO(OCH_2CH_2)_{160}OH$ | 7324 | 55.21 | 8.99 | 55.38 | 9.23 | Solid;white |

Table 6

Some Characteristics of Oxyethylated Esters of Fatty Acids

| Chemical and trade name | Cloud point, °C | Critical concentration of micelle formation | Hydro-lipophilic balance |
|---|---|---|---|
| Oxyethylated anhydrosorbitol monolaurate-20 (twin-20) | 95°C | $3 \times 10^{-4}$ | 16.7 |
| Oxyethylated anhydrosorbitol monopalmitate-40 (twin-40) | | | 15.6 |
| Oxyethylated anhydrosorbitol monostearate-60 | | | |

Table 6 —Continued

| Chemical and trade name | Cloud point, °C | Critical concentration of micelle formation | Hydro-lipophilic balance |
|---|---|---|---|
| (twin-60) Oxyethylated anhydrosorbitol tristearate-65 | 76°C | | 14.9 |
| (twin-65) Oxyethylated anhydrosorbitol monooleate-80 | | | 10.5 |
| (twin-80) Oxyethylated anhydrosorbitol trioleate-85 | 93°C | | 15.0 |
| (twin-85) | | | 11.0 |

We claim:

1. A catalyst for polymerization and copolymerization of olefins which is a binary system consisting of a complex compound having the general formula $(D-O-MX_{n-1})$, $mMX_n$, formed by the interaction between $MX_n$ and D, where M is a metal of variable valency belonging to Groups IVA–VA of the periodic system, X is a halogen or an oxyhalogen, n is the number characterizing the valency of the M, m is a whole number from 1 to 50, and D is a modifying ligand of the electron-donor type selected from the group consisting of a. polyglycolic ethers of monofunctional alcohols $R-(OCH_2CH_2)_k-OH$, where R is $C_6H_{13}-C_9H_{19}$ and k is 3—9;

b. polyglycolic ethers of polyfunctional alcohols $(R-COOCH_2)_2$ C $[CH_2 (OCH_2CH_2)_k-OH]_2$ where R is $C_4H_9-C_6H_{13}$ and k is 2.5–29 c. polyglycolic esters of carboxylic acids $R-CO(OCH_2CH_2)_k$ OH, where R is $C_{11}H_{23}-C_{17}H_{35}$ and $k = 10-160$ d. anhydrosorbitols of carboxylic acids

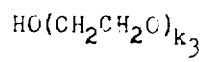

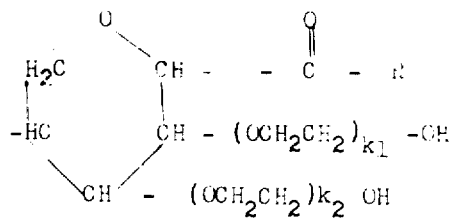

where $R = C_{11}H_{23} - C_{17}H_{35}$; $k_1 + k_2 + k_3 = 20-85$, in combination with an aluminum-organic compound having the general formula $AlR_pY_{3-p}$ where R is a lower alkyl or isoalkyl, Y is chlorine or hydrogen and p is from 1 to 3.

2. A catalyst according to claim 1, which is the system $[C_{17}H_{33}CO (OCH_2CH_2)_{40} -O-TiCl_3]\cdot 14TiCl_4 -(i-C_4H_9)_2 AlCl$.

3. A catalyst according to claim 1, which is the system $[C_9H_{19}(OCH_2CH_2)_9 -O-TiCl_3]\cdot 3TiCl_4 -(C_2H_5)_2 AlCl$.

4. A catalyst according to claim 1 which is the system $[C_{11}H_{23}CO (OCH_2CH_2)_{40} -O-VCl_3]\cdot 14VCl_4 -(C_2H_5)_2AlCl$.

5. A catalyst according to claim 1, which is the system $[C_6H_{13}(OCH_2CH_2)_4 -O-TiCl_3]\cdot TiCl_4 -(i-C_4H_9)_2 AlCl$.

6. A catalyst according to claim 1, which is the system $[C_9H_{19} (OCH_2CH_2)_9 -O-VCl_3] \cdot 3VCl_4 -(C_2H_5)_2AlCl$.

7. A catalyst according to claim 1, which is the system $C_4H_9COOCH_2)_2C$ $[CH_2 (OCH_2CH_2)_{7.5} -O-VCl_3]_2 \cdot 5VCl_4 -(i-C_4H_9)_2AlCl$.

8. A catalyst according to claim 1, which is the system $(C_4H_9COOCH_2)_2C$ $[CH_2(OCH_2CH_2)_{18.5}-O-TiCl_3]_2 \cdot 14TiCl_4(C_2H_5)_2AlCl$.

9. A catalyst according to claim 1, which is the system $(C_4H_9COOCH_2)_2C$ $[CH_2(OCH_2CH_2)_{12.5} -O-VOCl_2]_2 \cdot 8VOCl_3-(C_2H_5)_2 Al_2Cl_3$.

10. A catalyst according to claim 1, which is the system $[(C_5H_6O) (C_{17}H_{33}COO)_3 (OCH_2CH_2)_{85} -O-VOCl_2]\cdot 30VOCl_3 -(C_2H_5)_2AlCl$.

11. A catalyst according to claim 1, which is the system $[(C_5H_6O) (C_{11}H_{23}COO) (OCH_2CH_2)_{20} -O-VCl_3)_3]\cdot 7VCl_4 -(i-C_4H_9)_2 AlH$.

12. A catalyst according to claim 1, which is the system $[(C_4H_9COO)_2 C CH_2(OCH_2CH_2)_{29} -O-VOCl_2]_2 \cdot 18VOCl_3-(C_2H_5)_3 Al_2Cl_3$.

13. A catalyst according to claim 1, which is the system $[(C_5H_6O) (C_{15}H_{31}COO) (OCH_2CH_2)_{40} (OVCl_3)_3]\cdot 14VCl_4 -(i-C_4H_9)_2AlH$.

* * * * *